May 5, 1959 G. H. MAY 2,884,794
SELECTIVE CLUTCHING MECHANISM FOR RECIPROCATING MOTION
Filed Dec. 30, 1954 3 Sheets-Sheet 1
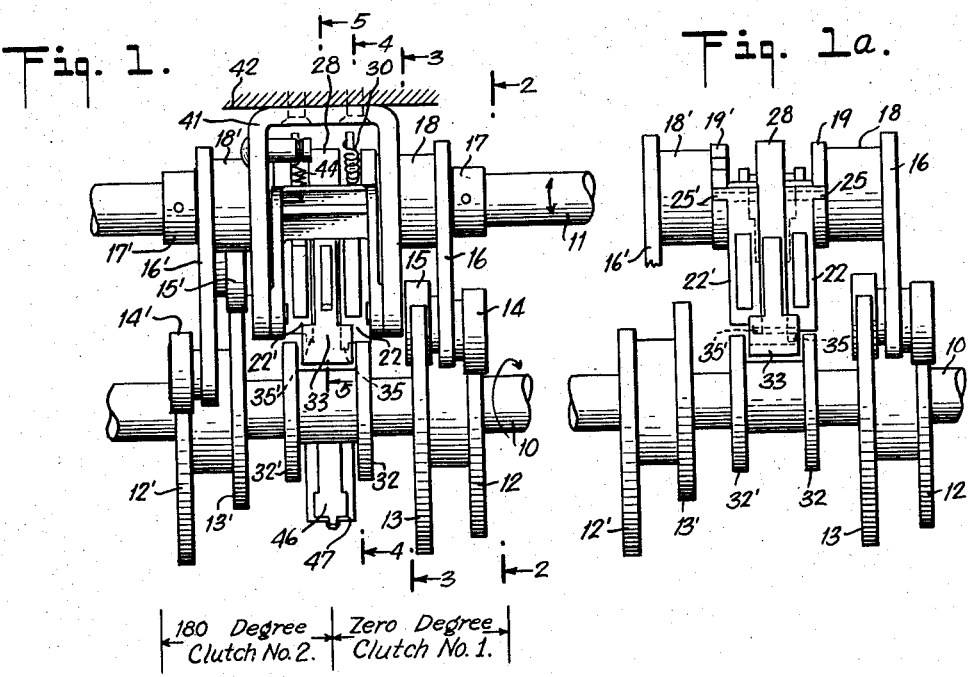
INVENTOR.
GORDON H. MAY
BY
ATTORNEY May 5, 1959            G. H. MAY            2,884,794
SELECTIVE CLUTCHING MECHANISM FOR RECIPROCATING MOTION
Filed Dec. 30, 1954            3 Sheets-Sheet 2
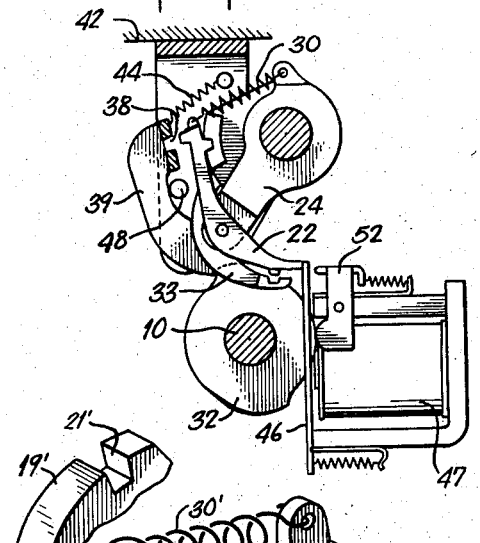
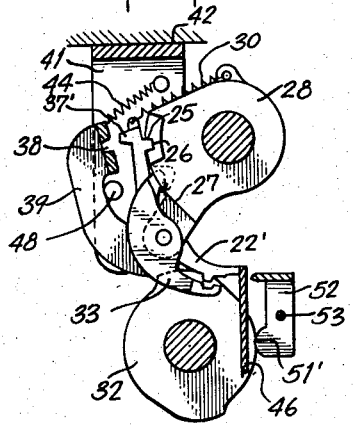
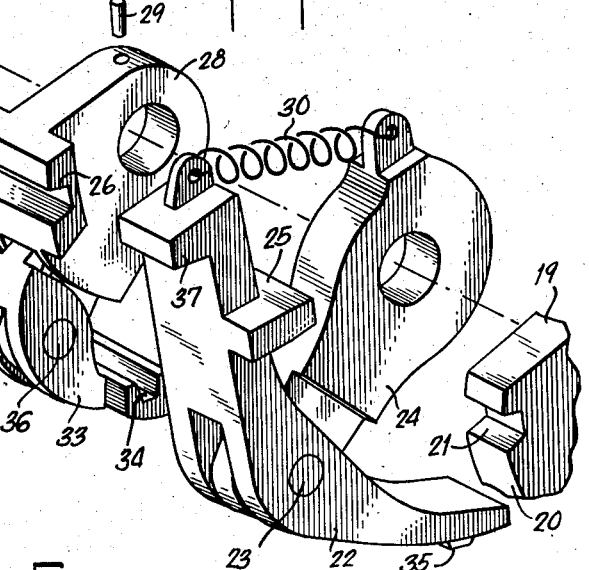
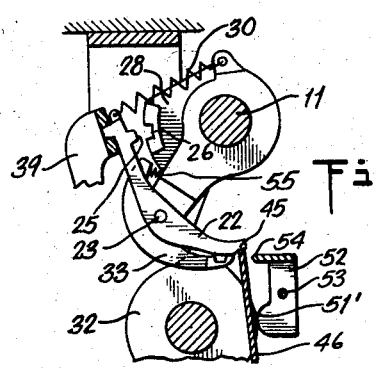
INVENTOR.
GORDON H. MAY
BY
ATTORNEY

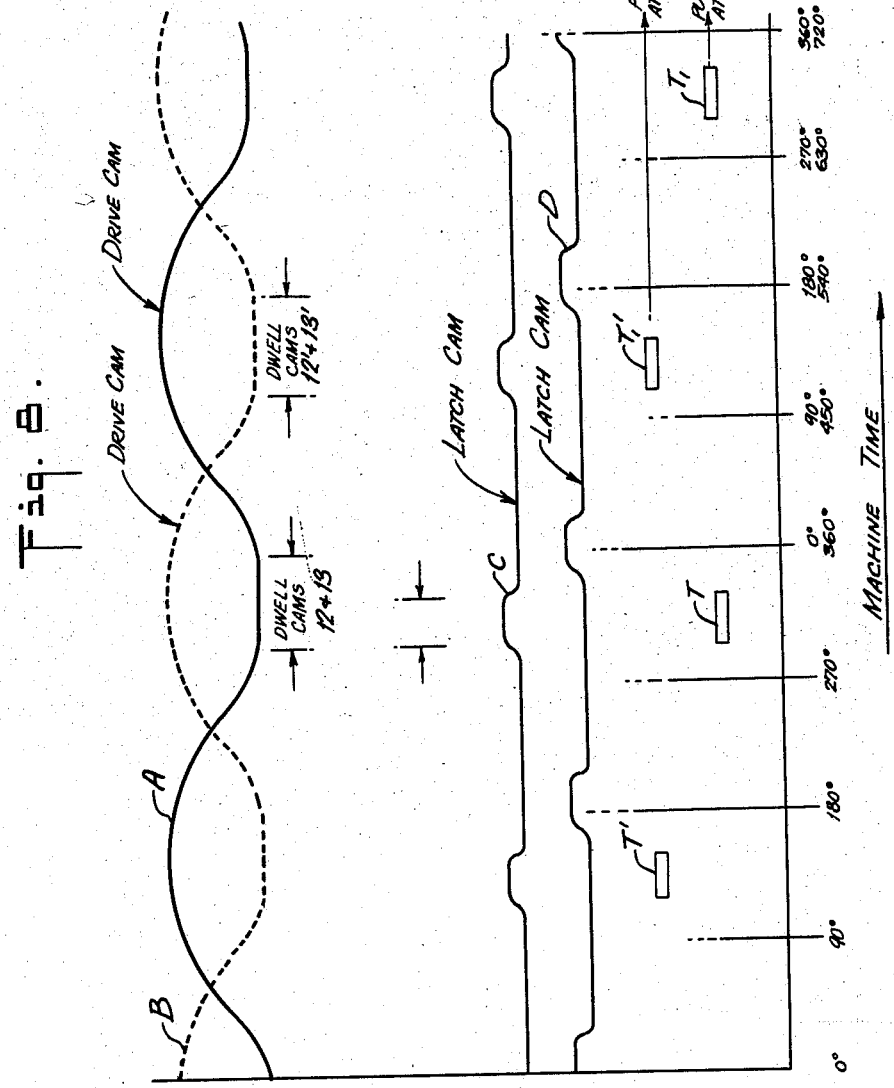

United States Patent Office 2,884,794
Patented May 5, 1959

2,884,794

SELECTIVE CLUTCHING MECHANISM FOR RECIPROCATING MOTION

Gordon H. May, Vestal, N.Y., assignor to International Business Machines Corporation, New York, N.Y., a corporation of New York Application December 30, 1954, Serial No. 478,667

24 Claims. (Cl. 74—126)

The present invention relates to clutching mechanisms and, particularly, to those for selectively driving reciprocating mechanism.

It is frequently desirable selectively to drive reciprocating mechanisms either from an oscillatory or rotating drive source. The clutch which selectively completes the mechanical connection between the source and driven mechanism preferably should be of the fast acting type and of compact yet sturdy and reliable construction. In certain applications it is further desirable that the clutching action have two or more potential driving cycles which are phase or position displaced at pre-selected machine time intervals. The clutch in this case should be free of the possibility of jamming upon selection of any potential driving cycle. Lastly, it is desirable that the clutch be actuated under control of some form of electrically actuated selector for convenience of clutch control.

It is an object of the present invention to provide a new and improved clutch possessing the desirable features of construction and operation enumerated above.

It is a further object of the invention to provide a novel electromechanical clutch, particularly suited selectively to drive a reciprocating mechanism and one characterized by an unusually high rapidity of operation of the order of several milliseconds.

It is an additional object of the invention to provide an improved clutch of relatively small physical size, yet one having a sturdy consttruction and good reliability and consistency of operation throughout its operating life.

It is yet a further object of the invention to provide an improved clutch for reciprocating mechanisms wherein selectable clutching may be accomplished at will at either half cycle or whole cycle machine times or multiples of either, yet without danger of clutch jamming at either of these potential driving cycles.

A selective clutching mechanism embodying the invention includes oscillatory driving and driven members, latch means for completing and interruptnig a mechanical driving connection between these members, means for selectively actuating the latch means to complete the driving connection, and means moving in unison with the driving member for reverse actuating the latch means to interrupt the driving connection at a pre-selected point in each cycle of oscillation of the driving member. Each of the driving and driven members may include means for restraining completion of the mechanical connection effected by the latch means until the driven and driving members occupy a pre-selected angular relationship with one another, whereby each completion and interruption of the driving connection occurs at a pre-selected point in the oscillatory cycle of the driven member.

Other objects and advantages of the invention will appear as the detailed description thereof proceeds in the light of the drawings forming a part of this application in which:

Fig. 1 illustrates the general assembly of a selective clutching mechanism embodying the present invention;

Figure 1a illustrates the clutching mechanism with the frame removed;

Fig. 2 is an end elevational view of the Fig. 1 construction;

Figs. 3, 4 and 5 are cross-sectional views taken along the similarly identified planes indicated in Fig. 1;

Fig. 6 is a cross-sectional view illustrating a lock-up phase of the clutch operation;

Fig. 7 is an exploded isometric view illustrating more clearly the arrangement and cooperative relationship of several key clutch components; and Figure 8 illustrates graphically the motion sequence of the clutch.

Referring now more particularly to Fig. 1, the clutch mechanism is shown arranged selectively to complete and interrupt a driving connection between a continuously rotating driving shaft 10 and an oscillatory driven shaft 11 which may, for example, support and actuate a crank arm (not shown) coupled to a reciprocating driven member such as the picker knives of a card supply hopper used with a tabulating, computing or like well known form of business machine. The Fig. 1 clutch construction actually includes two clutching mechanisms of very similar construction but having phase displaced operations. One of these is identified as a zero degree clutch #1 effective to complete and interrupt a clutching operation at zero machine time, while the other is identified as at 180° clutch #2 effective to complete and interrupt clutching operations at 180° machine time. By the term "machine time," as used herein, is meant a period in a repetitive machine operation as measured with respect to a pre-selected reference moment as, for example, one in which picker knives are at rest in a rear position at zero machine time but move to an extreme forward position at 180° machine time and return to their position of rest at 360° machine time. The two clutching mechanisms embodied in the Fig. 1 structure permit selective clutching actuation at zero and 180° machine time under control of a single electro-mechanical clutch actuation device and by the use of certain common clutch elements. In the following description, the arrangement and construction of clutch #1 will be described in detail, and reference numerals applied to its components will be applied as duplicate primed members to the corresponding components of clutch #2.

Clutch #1 of the Fig. 1 structure includes a pair of complementary cams 12, 13, shown more clearly in Fig. 2, which are supported upon and pinned to the drive shaft 10. Engaging these cams are respective cam rollers 14, 15 which are carried by a cam arm 16 journaled to move freely upon the driven shaft 11. A collar 17 is pinned to the shaft 11 and positions the cam arm longitudinally along the shaft. A sleeve 18 is united at one end to the cam arm 16, both to constitute the journal element for this arm and also to connect the arm to a drive disc 19, shown more clearly in Fig. 3, having an arcuate end surface 20 with a single latch notch or tooth 21 at an intermediate point of the arcuate surface. With this construction, it will be apparent that the rotary motion of the drive shaft 10 is converted by the cams 12 and 13 and cam follower structure 14—16 into an oscillatory motion of the drive disc 19. Since the cam follower assembly comprising elements 16—19 is freely journaled upon the driven shaft 11, this oscillatory motion of the assembly is not imparted to the shaft 11.

As shown more clearly in Figs. 4 and 7, the clutch includes a latch arm 22 which is pivoted at 23 to the end of a support arm 24 mounted upon the driven shaft 11 but free to move with an oscillatory motion thereon. The latch arm 22 includes a latch bar 25 arranged to engage the notch 21 of the drive disc 19 and also to engage a similar notch 26 provided in the arcuate surface 27 of a driven disc 28 also supported upon the driven shaft 11 but fixed to the latter as by a taper pin 29. The latch arm 22 is normally biased by a spring 30 into latch engagement wherein its latch bar 25 is positioned within the notches 21 and 26 to complete a driving connection between members 19 and 28. Figs. 3 and 4 illustrate the latch bar 25 in this driving engagement at a moment in the machine time just prior to the completion of a driving cycle.

As illustrated more clearly in Figs. 4, 5 and 6, a clutch driving cycle is terminated by a double lobed cam 32 which is mounted upon and pinned to the drive shaft 10 and engages the lower surface of latch 22 at a point immediately to the outside of a tooth 35. A dog 33 has a notch 34 at its free end arranged to engage the tooth 35 provided on the end of the latch arm 22 remote from the latch bar 25. This engagement is maintained by a spring 55. The action of the cam 32 is such that the latch arm 22 and dog 33 are moved about their respective pivots 23 and 36 to disengage the latch bar 25 from the notches 21 and 26 to interrupt the driving connection between the members 19 and 28. In fact, the cam 32 moves the latch arm 22 and the dog 33 even further than necessary to interrupt the driving connection last mentioned, the movement being sufficiently far that a tooth 37 provided on the upper end of the latch arm 22 engages a notch 38 provided in a locking member 39 pivoted at 40 (Fig. 3) on a shaft supported in a frame 41 which is to allow for aligning overlap of the latch arm teeth 35 and 37 with the notches of the dog 33 and member 39. The pivot points 23, 36 and 40 are aligned in the zero or rest position of these members. This fully locked position of the latch arm 22, dog 33 and locking member 39 is shown in Fig. 6 and serves the purpose of fixedly locking the driven shaft 11 in what might conveniently be called the "home" position once during each cycle of the oscillatory motion of the drive disc 19.

After the cam 32 in its continued movement begins to release latch 22, the locking member 39 moves with the latch 22 under actuation of a spring 44 in a direction to recomplete the clutching action between the drive disc 19 and driven disc 28. The latch arm 22 may be restrained from clutch engaging position by engagement of its remote end 45 with the end of an armature 46 of a deenergized electromagnet 47. Should the electromagnet 47 be energized at this time, to withdraw its armature 46 out of the path of the end 45 of the latch arm 22, the latch arm spring 30 and the locking member spring 44 move their associated members toward latch position. The locking member 39 is restrained by a pin 48 from moving further than to merely insure that the locking bar 25 of the latch arm 22 is sufficiently engaged in the notches 21 and 26 of the respective drive disc 19 and driven disc 28 to insure proper alignment.

Thus during this initial engagement of the locking bar 25, the tooth 37 of the latch arm 22 is still in engagement with the notch 38 of the locking member 39 to insure a proper positioning of the latch arm 22 with its latch bar 25 in engaging relation with the notches 21 and 26. Since the locking member 39 is restrained at this time by the pin 48 from further forward movement, the latch arm 22 is thereafter moved by its own spring 30 fully to engage the latch bar 25 in the notches 21 and 26 to complete the clutch driving connection between the members 19 and 28. Thereupon the tooth 37 of the latch arm 22 completely disengages from the notch 38 of the locking member 39 and frees the latch arm 22 to move with the drive disc 19 and driven disc 28 through the succeeding cycle of operation. It may be noted at this point that when the dog 33 previously engaged the tooth 35 of the latch arm 22, it also engaged the tooth 35' of the latch arm 22' (Fig. 7). Since the dog is common to the arms, it is effective to lock up driven disc 28 in the home position, because at this time the latch arms 22 and 22' are locked to the frame through the tooth 38 of locking member 39.

The cam 32 is also used to engage the projection 51 of a knock-off lever 52 pivoted at 53 to the frame of the electromagnet 47 and carrying at its upper end a forward projection 54 which engages the armature 46 of the electromagnet to effect armature knock-off at approximately 350° machine time, and thus prevent failure of the armature latching engagement with the latch arm 22 or 22' which might be caused by possible residual magnetism between the armature and electromagnet core after energization of the electromagnet has terminated.

In considering the operation of the clutch mechanism described, reference will be made to Fig. 8 which graphically shows the motion sequence chart for the clutch. As earlier mentioned, clutch #2 has a 180° phased displacement with respect to clutch #1. This is accomplished by relative positioning of the cams 12, 13 and 12', 13' on the drive shaft 10, and solid line curve A of Fig. 8 represents the clutch drive effected by the cams 12, 13 whereas the broken line curve B represents that of the cams 12' and 13'. Clutch #1 is actuated by energization of the electromagnet 47 at machine time T or $T_1$ which is shown in Fig. 8 as starting at approximately 300° of a previous cycle and during the cam dwell of the cams 12 and 13. During the short interval that an energizing pulse is applied to the electromagnet 47, the cam 32 maintains the latch arm 22, dog 33, and locking member 39 latched in their home position as shown by the latch cam actuating curve C.

Since actuation of the electromagnet 47 moves its armature 46 out of latching engagement with both latch arms 22 and 22', the selection as to which of the latch arms will ultimately complete the clutch driving engagement is determined by three mechanical conditions imposed by the clutch construction. The first of these is that the latch arm 22 or 22' must be in the home position and locked to the locking member 39 by cam actuation of the latch arms 22 and 22'; the second condition is that the driving disc 19 or 19' must also be in the home position by virtue of the fact that their associated cam rollers 14, 15 or 14', 15' are positioned on the dwell region of their cooperating respective cams 12, 13 or 12', 13'; and the last condition is that the driven disc 28 must also be in the home position. Since the cams 12, 13 and 12', 13' are phase displaced on the shaft 10, the second mentioned condition obviously can occur for the drive disc 19 only at zero machine time and can occur for drive disc 19' only at 180° machine time. Inasmuch as the energizing pulses T and T' occur only at the home position of the drive disc 19, they are effective to permit actuation only of clutch #1.

Thus after time has been allowed for the armature 46 to move freely from the path of the latch arms 22 and 22', the latch cam 32 at 320° machine time as shown by curve C allows both latch arms 22 and 22' to move toward latching engagement under action of their associated springs 30 and 30'. Since the drive disc 19' of clutch #2 is 180° out of phase at this time as represented by curve B, its associated latch arm 22' moves until the latch bar 25' engages the arcuate surface 20' of this drive disc and prevents further movement of the latch bar 25' into the notch 26 of the driven disc 28. On the other hand, the latch arm 22 continues its movement to engage its latch bar 25 in both notches 21 and 26 to complete the driving mechanism connection between the members 19 and 28 of clutch #1. Shortly after the completion of this selective portion of the clutch actuation, the cams 12 and 13 complete their dwell at zero machine time and start to accelerate the drive disc 19 through the cam arm 16 and cam rollers 14, 15. This motion of the drive disc 19 is transmitted through the latch arm 22 to the driven disc 28 and thereby to the driven shaft 11 to initiate a cycle of oscillatory motion of the latter.

It should be noted here that since the latch bar 25 or 25' of latch arm 22 or 22' moves only to the arcuate surface 20 or 20' of drive member 19 or 19', the dog 33 becomes disengaged from latch arm 22 or 22' and is moved by continued engagement of tooth 35 or 35' in notch 34 or 34', further outward, being forced by the action of spring 30 or 30' overcoming the minor spring 55 of the dog 33. This action unlocks latch arm 22 or 22' from the driven member 28 and allows latch arm 22 or 22' to remain locked to the frame through locking member 39 at all times while the other latch arm 22 or 22' moves, and is engaged with, the driving and driven member 21 or 21' and 28 respectively. This unique feature eliminates the need for two separate magnets to control the two clutches #1 and #2 and also the possibility of jamming as the driving tooth 21 or 21' passes the driven disc tooth 26 halfway through any feed cycle.

Shortly before each cycle initiation and specifically at approximately 350° machine time, the cam 32 engages the knock-off lever 52 as represented by curve D and insures that the armature 46 of the electromagnet 47 is returned toward its de-energized position where it is ready again to latch up the latch arms 22 and 22' at the completion of the clutch drive cycle. The latter occurs when the cam 32 again engages latch arms 22 and 22' and moves both latch bars 25 and 25' out of any previous engagement with the notch 26 of the driven disc 28 and into locking engagement with the notch 38 of the locking member 39.

If the electromagnet 47 is energized at pulse times T' or T₁', it can be shown by similar analysis that the clutch elements of clutch #2 all meet the three necessary conditions required for this clutch to complete its driving connection whereas the drive disc 19 of clutch #1 has progressed so far through a driving cycle that the latch bar 25 of clutch #1 engages the arcuate surface 20 of the drive member 19 to prevent completion of engagement of clutch #1. Thus only one electromagnet 47 need be used for selective actuation of the clutches for both potential feed cycles, and no switching circuit is necessary for either selection. Failure of the electromagnet in either the energized or deenergized position will in no manner cause a mechanically jammed condition of either of the clutches since the clutch interlocking is entirely mechanical. It will be clear that either of the two potential driving cycles may be selected and retained indefinitely, or the selection of one or the other driving cycle may be made at will.

It will be apparent from the foregoing description of the invention that a clutching mechanism embodying the invention may have a relatively small physical size yet be of sturdy construction and possess high reliability of mechanically interlocked and thus jam-free operation at either of two selectable potential operating cycles. The clutching mechanism employs relatively light weight selecting elements giving rise to high rapidity of clutch actuation of the order of only 5 to 8 milliseconds. There is the further advantage with a clutching mechanism embodying the invention that either of two potential driving cycles may be accomplished at either half cycle or whole cycle points or multiples of either and any such selection may continue indefinitely as desired simply under control of appropriate energization of a common electromagnet. All latch up operations in the clutch structure are positive and not critical relative to tolerance limits or normal wear over prolonged periods of clutch operation.

What is claimed is:

1. A selective clutching mechanism comprising, oscillatory driving and driven members, latch means for completing and interrupting a mechanical driving connection between said members, means for selectively actuating said latch means to complete said driving connection, and means moving in synchronizing relation to said driving member for reverse actuating said latch means to interrupt said driving connection at a pre-selected point in each cycle of oscillation of said driving member.

2. A selective clutching mechanism comprising, oscillatory driving and driven members, latch means for completing and interrupting a mechanical driving connection between said members, means for selectively actuating said latch means to complete said driving connection, and means moving in synchronized relation to said driving means for deactuating said last mentioned means after each actuation thereof and for subsequently reverse actuating said latch means to interrupt said driving connection at a pre-selected point in each cycle of oscillation of said driving member.

3. A selective clutching mechanism comprising, a rotatable driving member, means coupled to said member for imparting oscillatory motion to a clutch driving member, a clutch member to be driven, latch means for completing and interrupting a mechanical drive connection between said clutch members, means for selectively actuating said latch means to complete said driving connection, and means moving in synchronized relation to said rotatable driving member for reverse actuating said latch means to interrupt said driving connection at a pre-selected point in each cycle of oscillation of said clutch driving member.

4. A selective clutching mechanism comprising, oscillatory driving and driven members, latch means for completing and interrupting a mechanical driving connection between said members, means for selectively actuating said latch means to complete said driving connection, said driving and driven members each including means for restraining movement of said latch means to complete said driving connection until both said driving and driven members occupy a pre-selected angular relationship with one another, and means moving in synchronized relation to said driving member for reverse actuating said latch means to interrupt said driving connection at a pre-selected point in each cycle of oscillation of said driving member corresponding to said pre-selected angular relationship thereof, whereby each completion and interruption of a driving connection between said members by said latch means occurs at a said pre-selected angular relationship of said members.

5. A selective clutching mechanism comprising, driving means having oscillatory motion, means to be driven through selective cycles of oscillatory motion, a latch movable to latched position at which it completes a mechanical driving connection between said driving and driven means and to unlatched position at which said driving connection is interrupted, means for selectably moving said latch to said latched position thereof, and means moving in synchronized relation to said driving means for moving said latch to said unlatched position at a pre-established point in each cycle of said driving means.

6. A selective clutching mechanism comprising, driving means having oscillatory motion, means to be driven through selective cycles of oscillatory motion, a latch movable to latched position at which it completes a mechanical driving connection between said driving and driven means and to unlatched position at which said driving connection is interrupted, means for selectably moving said latch to said latched position thereof, means moving in unison with said driving means for moving said latch to said unlatched position at a pre-established point in each cycle of said driving means, and means moving in synchronized relation to said driving member for pre-positioning said latch in relation to said pre-selected point previous to each selective actuation thereof by said actuating means.

7. A selective clutching mechanism comprising, driving means having oscillatory motion, means to be driven through selective cycles of oscillatory motion, a latch movable to latched position at which it completes a mechanical driving connection between said driving and driven means and to unlatched position at which said driving connection is interrupted, means for selectably moving said latch to said latched position thereof, means moving in unison with said driving means for moving said latch to said unlatched position at a pre-established point in each cycle of said driving means, and means moving in synchronized relation to said driving means for pre-positioning said driven means and said latch in relation to said pre-selected point previous to each selective actuation of said latch by said actuating means.

8. A selective clutching mechanism comprising, driving means having oscillatory motion, means to be driven through selective cycles of oscillatory motion, a latch movable to latched position at which it completes a mechanical driving connection between said driving and driven means and to unlatched position at which said driving connection is interrupted, means for selectably moving said latch to said latched position thereof, means moving said latch to said unlatched position at a pre-established point in each cycle of said driving means, and means for restraining said latch in said unlatched position thereof until subsequent selective actuation thereof by said actuating means.

9. A selective clutching mechanism comprising, oscillatory driving and driven members moving in spaced coaxial relation and provided with latch engageable notches, a latch member supported for coaxial movement with said members and positioned to engage said notches thereof for completing and interrupting a mechanical driving connection between said driving and driven members, means for selectively actuating said latch member to complete said driving connection, and means moving in synchronized relation to said driving member for reverse actuating said latch member to interrupt said driving connection at a pre-selected point in each cycle of oscillation of said driving member.

10. A selective clutching mechanism comprising, oscillatory driving and driven members moving in spaced coaxial relation and having arcuate peripheral surfaces with an intervening latch engageable notch in each thereof, a latch member supported for coaxial movement with said members and positioned to engage said notches thereof to complete and interrupt a mechanical driving connection between said driving and driven members, means for selectively actuating said latch member to complete said driving connection, and means moving in synchronized relation to said driving member for reverse actuating said latch member to interrupt said driving connection at a pre-selected point in each cycle of oscillation of said driving member.

11. A selective clutching mechanism comprising a pair of drive members having relative phased displaced oscillatory motion, a driven member, latch means for completing and interrupting a mechanical driving connection between said driven member and each of said driving members, means for selectably actuating said latch means to complete a driving connection between said driven member and a selected one of said driving members, and means moving in synchronized relation to said driving members for reverse actuating said latch means to interrupt said driving connection at a corresponding pre-selected point in the cycle of operation of each said driving members.

12. A selective clutching mechanism comprising, a pair of drive members having relative phased displaced oscillatory motion, a driven member, latch means completing and interrupting a mechanical driving connection between said driven member and each of said driving members, means for selectably actuating said latch means to complete a driving connection between said driven member and a selected one of said driving members, each of said members including means for restraining completion of said mechanical connection by said latch means until said driven member and a selected one of said driven members occupy a pre-selected angular relationship with one another, and means moving in synchronized relation to said driving members for reverse actuating said latch means to interrupt said driving connection at a pre-selected point in each cycle of operation of each said driving members corresponding to said pre-selected angular relationship.

13. A selective clutching mechanism comprising, oscillatory driving and driven members, latch means for completing and interrupting a mechanical driving connection between said members, means tending to move said latch means to complete and maintain said driving connection, means for restraining said latch means in non-driving position but selectably actuable to release said latch means to complete said driving connection, and means moving in synchronized relation to said driving member for interrupting said driving connection to permit restoration of the restraining action of said restraining means over said latch means at a preselected point in each cycle of oscillation of said driving member.

14. A selective clutching mechanism comprising, oscillatory driving and driven members, latch means for completing and interrupting a mechanical driving connection between said members, a spring for biasing said latch means toward a first position in which said driving connection is completed, control means for restrainably latching said latch means in a second position interrupting said driving connection but selectably controllable to release said latch means to said first position to complete said driving connection, and means moving in synchronized relation to said driving member for restoring said latch means to said second position thereof to interrupt said driving connection and permit restoration of restraint by said control means over said latch means at a preselected point in each cycle of oscillation of said driving member.

15. A selective clutching mechanism comprising, oscillatory driving and driven members, latch means for completing and interrupting a mechanical driving connection between said members, means tending to move said latch means to complete and maintain said driving connection, means for restraining said latch means in non-driving position but selectably actuable to release said latch means toward a drive position thereof where said driving connection is completed, said driven member including means for permitting completion of said driving connection only in a predetermined angular position of said driven member, and means moving in synchronized relation to said driving means for interrupting said driving connection to permit restoration of the restraining action of said restraining means over said latch means at a preselected point in each cycle of oscillation of said driving member.

16. A selective clutching mechanism comprising, oscillatory driving and driven members, latch means for completing and interrupting a mechanical driving connection between said members, a spring for biasing said latch member toward a first position in which said driving connection is completed, control means for restrainably latching said latch means in a second position interrupting said driving connection but selectably controllable to release said latch means toward a drive position thereof where said driving connection is completed, said driven member including a member having an arcuate peripheral surface with a latch notch at a predetermined angular position therein to prevent completion of said driving connection except at said predetermined angular position, and means moving in synchronized relation to said driving member for restoring said latch means to said second position thereof to interrupt said driving connection and permit restoration of the restraining action of said control means over said latch means at a preselected point in each cycle of oscillation of said driving member.

17. A selective clutching mechanism comprising, oscillatory driving and driven members rotatably positioned in side-by-side coaxial relation and including arcuate peripheral surfaces having a latch notch at a common predetermined angular position in each thereof, a latch member supported for coaxial movement with said members and including a latch bar spanning said members and movable radially into engagement with the latch notches thereof to complete a driving connection therebetween when said driving and driven members occupy a predetermined common angular position, said latch bar being prevented by said arcuate surfaces from completing said driving connection whenever either of said driving and driven members does not occupy said predetermined common angular position, means for selectively actuating said latch member to complete said driving connection, and means moving in synchronized relation to said driving member for interrupting said driving connection at a preeslected point in each cycle of oscillation of said driving member corresponding to said predetermined common angular position.

18. A selective clutching mechanism comprising, oscillatory driving and driven members rotatably positioned in side-by-side coaxial relation and including individual arcuate peripheral surfaces having a latch notch at a common predetermined angular position of each thereof, a latch member supported for coaxial movement with said members and including a latch bar spanning said members and movable radially into engagement with the latch notches thereof to complete a driving connection therebetween when said driving and driven members occupy a predetermined common angular position, said latch bar being prevented by said arcuate surfaces from completing said driving connection whenever either of said driving and driven members does not occupy said predetermined common angular position, means tending to move said latch bar radially to complete and maintain said driving connection, means for restraining said latch bar in nondriving position but selectably actuable to release said latch bar toward a drive position thereof where said driving connection is completed, and means moving in synchronized relation to said driving member for interrupting said driving connection to permit restoration of the restraining action by said restraining means over said latch bar at a preselected point in each cycle of oscillation of said driving member corresponding to said predetermined common angular position thereof.

19. A selective clutching mechanism comprising, oscillatory driving and driven members rotatably positioned in side-by-side coaxial relation and including individual arcuate peripheral surfaces having a latch notch at a common predetermined angular position of each thereof, a latch member supported for coaxial movement with said members and including a latch bar spanning said members and movable radially into engagement with the latch notches thereof to complete a driving connection therebetween when said driving and driven members occupy a preselected common angular position, said latch bar being prevented by said arcuate surfaces from completing said driving connection whenever either of said driving and driven members does not occupy said predetermined common angular position, a spring for biasing said latch bar radially toward a first position in which said driving connection is completed, control means for restrainably latching said latch bar in a second position interrupting said driving connection but selectably controllable to release said latch bar to said first position to complete said driving connection, and means moving in synchronized relation to said driving member for interrupting said driving connection to permit restoration of the restraining action by said control means over said latch bar at a preselected point in each cycle of oscillation of said driving member corresponding to said predetermined common angular position thereof.

20. A selective clutching mechanism comprising, a pair of drive members having relative phased displaced oscillatory motion, a driven member, latch means for completing and interrupting a mechanical driving connection between said driven member and each of said driving members, means tending to move said latch means to complete and maintain said driving connection, means for restraining said latch means in nondriving position but selectably actuable to release said latch means to complete a driving connection between said driven member and a selected one of said driving members, and means moving in synchronized relation to said driving members for interrupting said driving connection to restore the restraining action of said restraining means over said latch means at a corresponing preselected point in the cycle of operation of each said driving members.

21. A selective clutching mechanism comprising, a pair of drive members having relative phased displaced oscillatory motion, a driven member, latch means for completing and interrupting a mechanical driving connection between said driven member and each of said driving members, a spring for biasing said latch means toward a first position in which said driving connection is completed, control means for restrainably latching said latch means in a second position interrupting said driving connection but selectably controllable to release said latch means to said first position to complete a driving connection between said driven member and a selected one of said driving members, and means moving in synchronized relation to said drive members for restoring said latch means to said second position thereof to interrupt said driving connection and permit restoration of the restraining action by said control means over said latch means at a corresponding preselected point in the cycle of operation of each said driving members.

22. A selective clutching mechanism comprising, a pair of drive members having relative phased displaced oscillatory motion, a driven member, latch means for completing and interrupting a mechanical driving connection between said driven member and each of said driving members, means tending to move said latch means to complete and maintain said driving connection, means for restraining said latch means in nondriving position but selectably actuable to release said latch means toward a drive position thereof where a driving connection is completed between said driven member and a selected one of said driving members, said driven member including means for permitting completion of said driving connection with either of said driving members only in a predetermined angular position of said driven member, and means moving in synchronized relation to said driving members for interrupting said driving connection to permit restoration of the restraining action of said restraining means over said latch means at a corresponding preselected point in the cycle of operation of said driving members.

23. A selective clutching mechanism comprising, a pair of drive members having relative phased displaced oscillatory motion, a driven member, latch means for completing and interrupting a mechanical driving connection between said driven member and each of said driving members, a spring for biasing said latch means toward a first position in which the driving connection is completed between said driven member and a selected one of said driving members, electromagnetic control means for restraining said latch means in nondriving position but selectably actuable to release said latch means toward a drive position where a driving connection is completed between said driven member and a selected one of said driving members, said driven member including a member having an arcuate peripheral surface with a latch notch at a predetermined angular position therein to prevent completion of said driving connection except at said predetermined angular position, and means moving in synchronized relation to said driving members for interrupting said driving connection to permit restoration of the restraining action by said control means over said latch means at a corresponding preselected point in the cycle of operation of each said driving members corresponding to said predetermined angular position of said driven member.

24. A selective clutch mechanism comprising, a pair of drive members rotatably positioned in spaced coaxial relation and having relative phased displaced oscillatory motion, a driven member rotatably positioned in coaxial relation with and intervening between said driven members, said drive and driven members including individual arcuate peripheral surfaces having a latch notch in each thereof, a pair of latch members supported for coaxial movement with said members and each including a latch bar spanning said driven member and an individual one of said drive members and movable radially into engagement with the latch notches of said driven member and said individual drive member to complete a driving connection therebetween when said last-mentioned latch notches occupy a predetermined common angular position, each said latch bar being prevented by said arcuate surfaces from completing said driving connection whenever the notch of the driving and drive members individual thereto do not occupy said predetermined common angular position, means selectably actuating said latch members to complete a driving connection between said driven member and a selected one of said drive members, and means moving in synchronized relation to said driving members for interrupting said driving connection at a corresponding preselected point in the cycle of operation of each said driving member corresponding to said predetermined angular position thereof.

References Cited in the file of this patent

UNITED STATES PATENTS 2,778,241    Gaubatz _____ Jan. 22, 1957

FOREIGN PATENTS 733,384    Germany _____ Mar. 25, 1943

UNITED STATES PATENT OFFICE
CERTIFICATE OF CORRECTION

Patent No. 2,884,794                                                          May 5, 1959

Gordon H. May

It is hereby certified that error appears in the printed specification of the above numbered patent requiring correction and that the said Letters Patent should read as corrected below.

Column 1, line 43, for "consttruction" read -- construction --; line 54, for "interruptnig" read -- interrupting --; column 2, line 46, for "members" read -- numbers--; column 3, line 3, strike out "but"; column 7, line 75, for "driven" read -- driving --; column 10, line 52, after "operation of" insert -- each --.

Signed and sealed this 1st day of September 1959.

(SEAL)
Attest:

KARL H. AXLINE

Attesting Officer

ROBERT C. WATSON

Commissioner of Patents